United States Patent [19]

Sugo et al.

[11] Patent Number: 4,625,546

[45] Date of Patent: Dec. 2, 1986

[54] CYLINDER POWER BALANCE DIAGNOSTIC APPARATUS FOR INTERNAL COMBUSTION ENGINE

[75] Inventors: Hiroyuki Sugo, Katsuta; Takashi Aoki, Kanuma, both of Japan

[73] Assignee: Hitachi, Ltd., Tokyo, Japan

[21] Appl. No.: 672,366

[22] Filed: Nov. 16, 1984

[30] Foreign Application Priority Data

Nov. 18, 1983 [JP] Japan .................................. 58-218537

[51] Int. Cl.$^4$ .......................................... G01M 15/00
[52] U.S. Cl. ..................................................... 73/116
[58] Field of Search ....................... 73/115, 116, 117.3, 73/119 R, 120; 324/166

[56] References Cited

U.S. PATENT DOCUMENTS

| | | | |
|---|---|---|---|
| 29,984 | 5/1879 | Howes | 73/117.3 |
| 2,887,654 | 5/1959 | Strassman et al. | 324/166 |
| 3,400,579 | 6/1966 | Parmater et al. | 73/117.3 |
| 3,572,103 | 3/1971 | Marino | 73/116 |
| 3,788,129 | 1/1974 | Trussell | 73/116 |
| 4,295,363 | 10/1981 | Buck et al. | 73/117.3 |

Primary Examiner—Stewart J. Levy
Assistant Examiner—Robert R. Raevis
Attorney, Agent, or Firm—Antonelli, Terry & Wands

[57] ABSTRACT

There is provided a cylinder power balance diagnostic apparatus for an internal combustion engine, in which all of the diagnostic procedures are automatically conducted. An ignition signal generated in synchronism with an ignition pulse to be supplied to each cylinder is taken out. On the basis of the ignition signal, at least one cylinder to be misfired is designated. The designated cylinder is misfired for a predetermined period and the number of engine rotations is detected when the period has elapsed. Such operation is successively conducted for respective cylinders. On the basis of the number of engine rotations when misfiring of each cylinder has been finished, a detective cylinder is determined.

4 Claims, 7 Drawing Figures

```
       [POWER BALANCE]
****************
*              *
* POWER BALANCE OK *
*              *
****************
THE NUMBER     760 RPM
OF ROTATIONS

ORDER OF      ROTATION
IGNITION      RATIO (%)

CYLINDER POWER BALANCE DIAGNOSTIC APPARATUS FOR INTERNAL COMBUSTION ENGINE

BACKGROUND OF THE INVENTION

The present invention relates to an output balance diagnostic apparatus used for an internal combustion engine and in particular to such an apparatus which is suitable for diagnosing whether the mechanical system of the automobile engine is working properly.

Something wrong with the engine output might be caused by an abnormality in the ignition, the gas mixture or pressure in the cylinders. The ignition and fuel can be inspected and adjusted with relative ease. However, trouble in cylinder pressure is often caused by abnormality existing in the mechanical system such as a valve, ring or piston of the engine cylinder. In addition, for inspecting and adjusting the cylinder pressure, the engine body must be removed, disassembled, and installed. Before carrying out these operations, therefore, it must be positively determined which cylinder is out of order. Erroneous determination makes labors spent for removing, disassembling and installation fruitless. When a particular cylinder among a plurality of cylinders becomes out of order, it becomes more difficult to determine the cause of the abnormality as the number of cylinders increases.

When an abnormality in the output of a particular cylinder of an engine having a multiplicity of cylinders is incurred by some cause, only an expert can locate and inspect the abnormalities, such as falling off of a gasket in the cylinder head or burning (or seizure) of a piston ring provided that the engine body must be disassembled. Even if the engine is out of order, therefore, the driver often continues to drive the car without noticing that fact. Unfortunately, leaving such an abnormality as it is often results in serious damage which results in complete breakdown of the engine.

SUMMARY OF THE INVENTION

An object of the present invention is to provide an output balance diagnostic apparatus for an internal combustion engine, which is useful in determining whether the mechanical system is good or not by stopping combustion in a particular cylinder of the engine without disassembling the engine.

Another object of the present invention is to provide an output balance diagnostic apparatus for an internal combustion engine, which automatically determines a defective cylinder.

In accordance with the present invention, a signal related to an ignition signal is taken out of an ignition circuit of an internal combustion engine, and cylinders are successively misfired one or two at a time during a predetermined time based upon the signal taken out. The number of stable rotations of the engine when no cylinders are misfired is detected along with the number of stable rotations of the engine when one or two cylinders are misfired. Based upon these numbers of rotations thus detected, a defective cylinder is determined.

DESCRIPTION OF THE PREFERRED EMBODIMENTS

Figure 1:
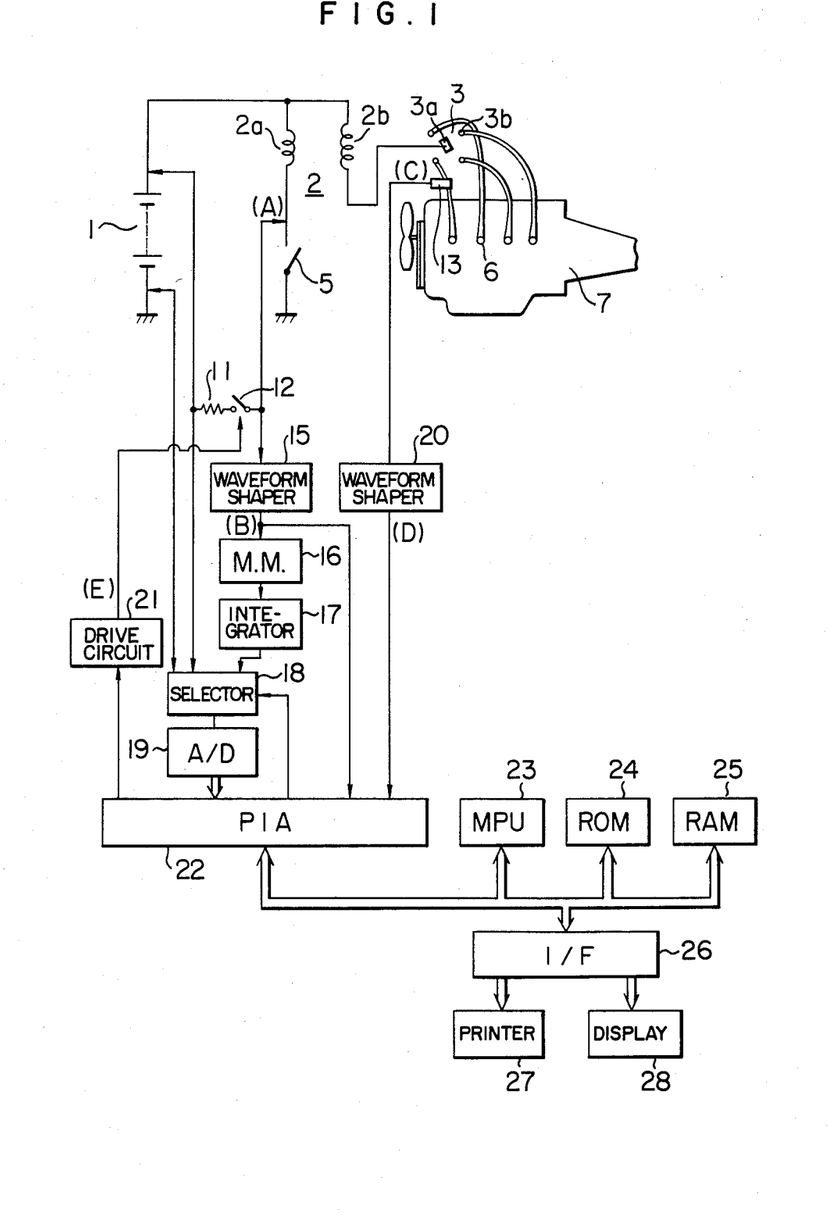
FIG. 1 shows the entire configuration of an apparatus according to the present invention.

FIG. 1 shows the configuration of an embodiment of an output balance diagnostic apparatus for an internal combustion engine according to the present invention. In FIG. 1, current supplied from a battery 1 is fed to a primary coil 2a of an ignition coil 2 by means of an interrupter 5. The interrupter 5 may be a power transistor located at the final stage of the ignition circuit. The boosted power supply is fed from the secondary coil 2b of the ignition coil 2 to an engine 7 having, say, four cylinders through a distributor 3. The distributor 3 is composed of a movable terminal 3a connected to the secondary coil 2b and four stationary terminals 3b connected to plugs 6 of respective cylinders of the engine 7.

Figure 2:
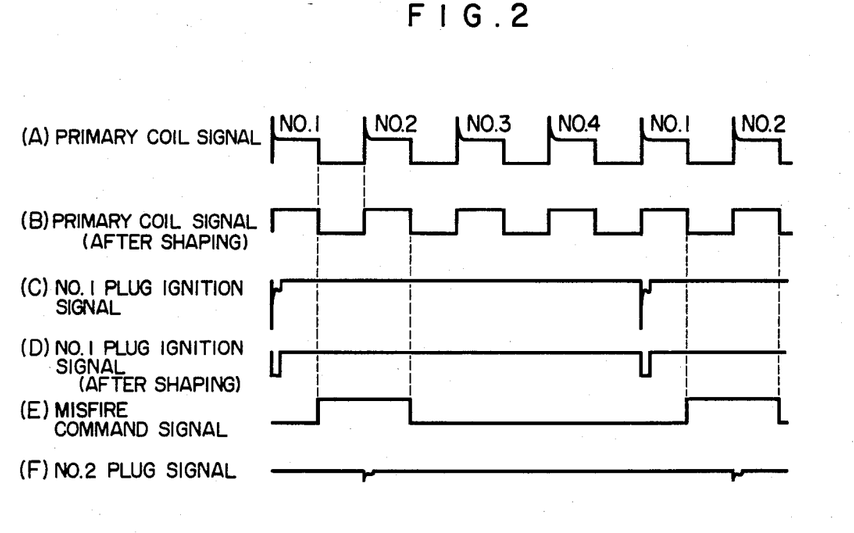
FIG. 2 shows waveforms appearing in the principle parts of the apparatus illustrated in FIG. 1.

A primary coil signal appearing at a coupling point between the primary coil 2a of the ignition coil 2 and the interrupter 5 has a waveform as illustrated in FIG. 2(A). The primary coil signal is converted into a waveform as illustrated in FIG. 2(B) by a waveform shaping circuit 15 and then supplied to a peripheral interface adapter (hereinafter referred to as PIA) 22 and to a monostable multivibrator 16. The monostable multivibrator 16 produces pulses each of which has a predetermined width and has a rising edge in response to a falling edge of the primary coil signal after being subjected to waveform shaping. The pulses produced by the multivibrator 16 are integrated in an integrator 17 to yield the average DC voltage which depends upon the pulse width and the pulse repetition period. When the number of rotations is large, the DC level is raised because of the shortened pulse repetition period. Accordingly, the DC voltage can be detected as representative of the number of rotations of the engine. In accordance with a command fed from the PIA 22, a selector 18 selects as its output either the DC voltage fed from the integrator 17 or the voltage of the battery 1. The output voltage of the selector 18 is subjected to A/D conversion in an A/D converter 19 to be supplied to the PIA 22.

One particular plug among the ignition plugs 6 of respective cylinders in the engine 7 is selected as a reference cylinder. For example, plug No. 1 among plugs Nos. 1 to 4 is selected as the reference cylinder. A reference cylinder sensor 13 is attached to the lead connected to the plug No. 1. The sensor 13 produces a No. 1 plug ignition signal as illustrated in FIG. 2(C). The No. 1 plug ignition signal is subjected to waveform shaping in a waveform shaping circuit 20 to have a waveform as illustrated in FIG. 2(D). The No. 1 plug ignition signal thus shaped in supplied to the PIA 22.

Between the power supply side (+) of the battery 1 and the terminal (−) of the primary coil 2a of the ignition coil 2 which is coupled to the interrupter 5, a series circuit composed of a resistor 11 and a contact 12 is connected. The contact 12 is opened or closed in accordance with a misfire command signal as illustrated in FIG. 2(E) which is supplied from the PIA 22 to the contact through a drive circuit 21. The contact 12 is a switching element such as a contact of a relay which is energized by the drive circuit 21. If the contact 12 is open, the energy stored in the ignition coil 2a is transferred to the secondary coil 2b to produce a high voltage immediately after the interrupter 5 has been opened. If the contact 12 is closed, however, the energy stored in the ignition coil 2a is bypassed by the resistor 11. Since the secondary coil 2b is not supplied with sufficient energy, the coil 2b is misfired.

For example, when only cylinder No. 2 is to be misfired, the contact 12 must be closed by an a misfire command signal which has such a pulse width as to cover the ignition period of the plug No. 2. Since the ignition signal fed to the plug of the cylinder No. 2 is then largely reduced in energy as illustrated in FIG. 2(F), the cylinder No. 2 is not ignited.

The PIA 22 sends/receives data to/from a microprocessing unit (hereafter referred to as MPU) 23. In accordance with the program stored in a ROM 24, the MPU 23 executes computation using data supplied thereto from the PIA 22. The result of computation is successively stored in a RAM 25. Necessary data is supplied to a printer 27 and a display unit 28 via an interface unit 26 to be printed and displayed.

The procedure for diagnosing the output balance of an internal combustion engine using the above described apparatus will now be described by referring to FIG. 3. At first, the engine is started and the number of rotations thereof is set to a fixed value. To accomplish the setting, the accelerator pedal is so fixed as to exhibit, say, approximately 1,000 rpm by using an accelerator fixing device fixed to both the steering wheel and accelerator pedal and having a length which can be finely adjusted. When the number of rotations has been stabilized, the initial number of rotations of the engine is read out at a step 30. At a step 31, a first counter in the PIA 22 is set to 1 and a timer is started. The first counter defines which cylinder is to be misfired when counted from the occurrence of the No. 1 plug ignition signal. Since counting is started after the No. 1 plug ignition signal has been generated, the cylinder No. 2 is misfired at first. The timer is located in the PIA 22 and is used to measure the duration during which the cylinder designated by the first counter remains in a misfire condition. When the No. 1 plug ignition signal as illustrated in FIG. 2(D) is detected by the PIA 22, a second counter is reset at a step 32. The second counter counts falling edges of the primary coil signal as illustrated in FIG. 2(B) and indicates the last cylinder which has passed the ignition period. When the contents of the second counter becomes coincident with those of the first counter, namely, when the cylinder which has been designated to be misfired enters the next ignition period, this fact is detected at a step 33. And, the misfire command signal as illustrated in FIG. 2(E) is produced at a step 34. The next falling edge of the primary coil signal (B) is detected at a step 35, and the output of the misfire command signal (E) is canceled at a step 36. It is determined whether the timer has measured 3 seconds or not at a step 37. For the answer "no", control is returned to the step 32 to repeat the operation heretofore described. The time of 3 seconds is the time required for the number of rotations to be stabilized after the beginning of misfiring. If the answer at the step 37 is "yes", the number of rotations of the engine is immediately read out of the integrator 17 through the selector 18 and the A/D converter 19 at a step 38. After the misfiring has been canceled, the time of 3 seconds elapses at a step 39 to allow stabilization in the number of rotations of the engine. The number of rotations of the engine is then read out at a step 40. Subsequently, it is determined at a step 41 whether the contents of the first counter are equal to the number of cylinders less one or not. If the answer is "no", namely if the misfiring operation of the cylinder No. 4 is not reached, the first counter is incremented by one and the timer is started at a step 42. Then the control is returned to the step 32 to repeat the misfiring operation for the next cylinder. If the answer at the step 41 is "yes", the misfiring operation of the cylinder No. 4 has already been finished, but the misfiring operation of the cylinder No. 1 is not yet performed.

The misfiring operation of the cylinder No. 1 will now be described. At a step 43, the number of cylinders is set in the first counter and the timer is started. Subsequently, the No. 1 plug ignition signal is detected at a step 44 and the second counter is reset at a step 45. When the contents of the second counter become coincident with those of the first counter, the fact is detected at a step 46 and the misfiring command signal is immediately outputted at a step 47. The next falling edge of the primary coil signal as illustrated in FIG. 2(B) is detected at a step 48 and the output of the misfire command signal is canceled at a step 49. The number of cylinders less one is set in the first counter at a step 50. The reason why the number of cylinders less one is set in the first counter is as follows. From the second misfiring the No. 1 plug ignition signal is not produced since the plug remains in the misfire condition. When the first counter has counted the falling edges of the primary coil signal as illustrated in FIG. 2(B) by the number of cylinders less one from the termination of the ignition period of the cylinder No. 1, i.e., from the falling edge of the primary coil signal No. 1 as illustrated in FIG. 2(B), the ignition period of the cylinder No. 1 must be started. At a step 52, it is determined whether 3 seconds has elapsed after the timer was started. If the answer at the step 52 is "no", control is returned to the step 45 to perform the misfiring operation of the cylinder No. 1 again. When 3 seconds has thus elapsed, the answer at the step 52 becomes "yes". At a step 53, therefore, the number or rotations of the engine is immediately read out. The misfiring operation for all cylinders has thus been completed.

During the misfiring operation of each cylinder as described above, three out of four cylinders bear the engine output in common. If the misfired cylinder is normal, therefore, the number of rotations of the engine is lowered as compared with that before misfire. On the other hand, experiments show that there is no difference or little difference between the number of rotations before misfiring and that during misfiring when the misfired cylinder includes a smoldering plug or a head gasket having a hole. That is to say, the output balance can be diagnosed by evaluating the number of rotations during misfiring.

Figure 3:
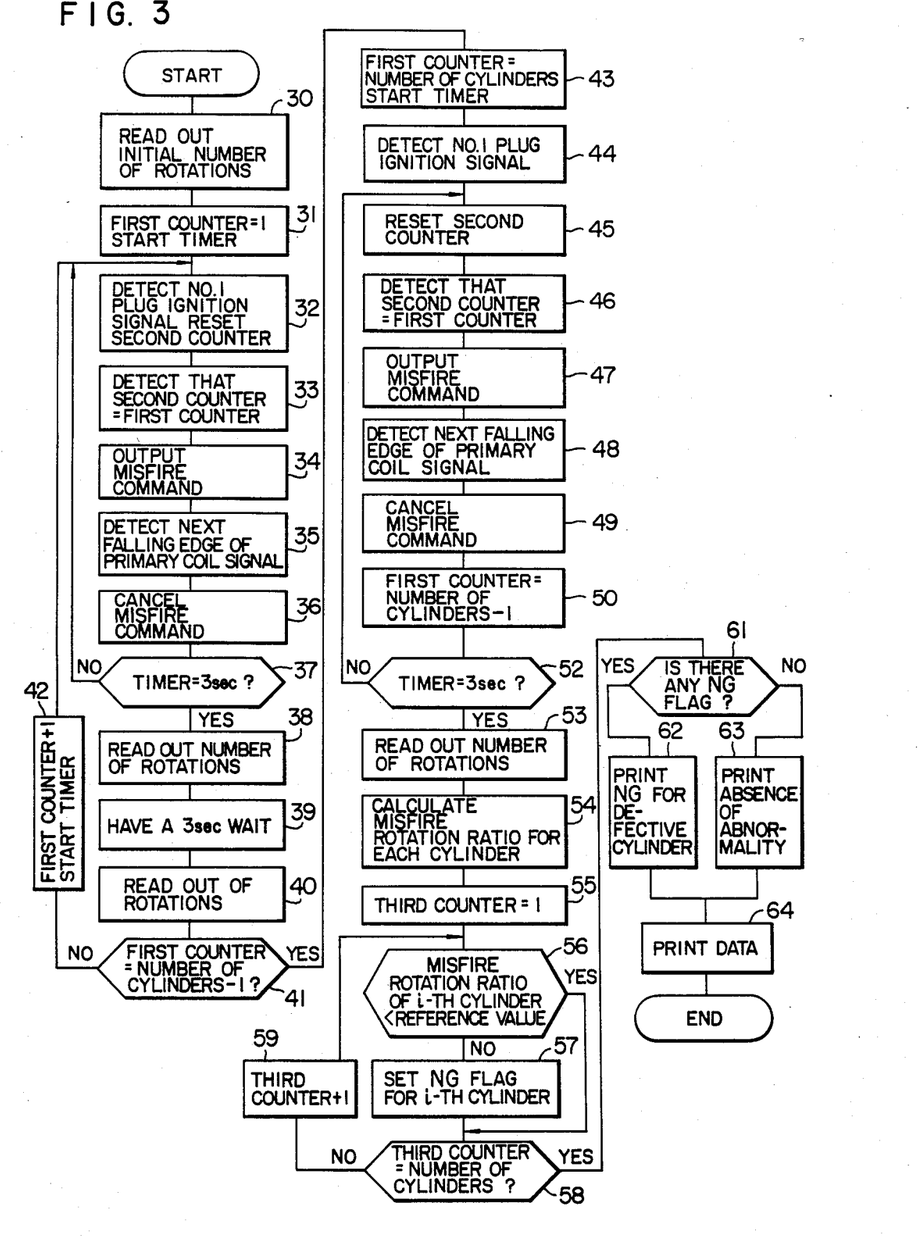
FIG. 3 shows a flow chart for illustrating the operation of the apparatus according to the present invention.
Figure 4:
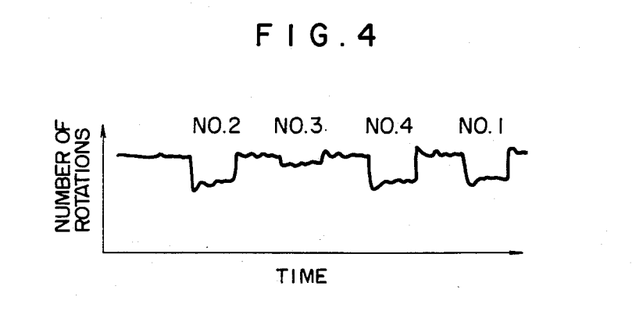
FIG. 4 shows how the number of rotations of the internal combustion engine of FIG. 3 in operation changes with time.

Assuming that proper combustion is not conducted in the third cylinder due to an abnormality in its suction valve, FIG. 4 shows how the number of rotations of the engine varies with time when the engine is subjected to the steps 30 to 53 according to the present invention as illustrated in FIG. 3. As evident from FIG. 4, there is little difference between the number of rotations before the misfiring of the third cylinder and that after its misfiring. Thus, it becomes possible to diagnose an abnormality by processing the rotation data.

By using the above described misfire measurement results, the operation for diagnosing the output balance of the engine is started. At first, at a step 54, misfiring rotation ratios are calculated for respective cylinders by using an expression such as (the number of rotations during misfiring)/(the number of rotations before misfiring)×100

Figure 5:
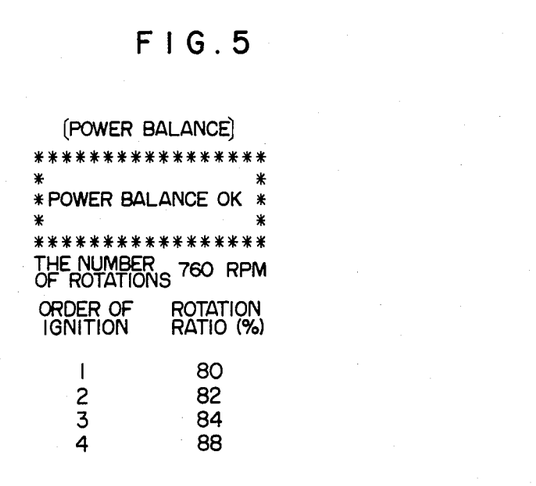
FIG. 5 shows an example of printed data obtained as the final result when the operation of FIG. 3 has been executed.

A value "1" is set in a third counter at a step 55. It is determined at a step 55 whether the misfiring rotation ratio of the cylinder No. 1 is smaller than the decision reference value or not. From actual experience, the suitable decision reference value is 92% for four cylinders and is 94% for six or eight cylinders. The answer "no" at the step 56 indicates the existence of an abnormality in the cylinder No. 1. At a step 57, therefore, a flag indicating an abnormality is set for the cylinder No. 1. If the answer at the step 56 is "yes" indicating the absence of an abnormality, the step 57 is jumped. At a step 58, it is determined whether the contents of the third counter are coincident with the number of cylinders or not. Since the cylinder No. 1 is now under examination, the answer is "no". After the third counter is advanced by one step, control is returned to the step 56. In the same way as the foregoing description, the misfire rotation ratio is evaluated for the next cylinder. When evaluation for all cylinders has been completed, the answer at the step 58 becomes "yes". As a step 61, it is determined whether there is a detective one among the cylinders which have been evaluated or not. If the answer at the step 61 is "yes", the defective cylinder is printed at a step 62. If the answer is "no", a message representing the absence of an abnormality is displayed at a step 63. At a step 64, the misfire rotation ratios of respective cylinders are printed. FIG. 5 shows an example of the printing when there is no abnormality.

In the above described embodiment, one cylinder is misfired at a time. This method poses no problem for four cylinders. For an engine having much more cylinders, say, eight cylinders, however, the decrease in the number of rotations is not significant even if only one cylinder is misfired, resulting in a deteriorated diagnosis precision. In such a case, therefore, respective cylinders are misfired one at a time at first. A cylinder which has indicated the most remarkable change in the number of rotations is selected as a normal cylinder. The cylinders including the cylinder thus selected are successively misfired two at a time. By doing so, the decrease in the number of rotations of the engine becomes larger than the sum of decreases where cylinders are misfired one by one. As a result, deterioration in the diagnosis precision can be prevented.

Figure 6:
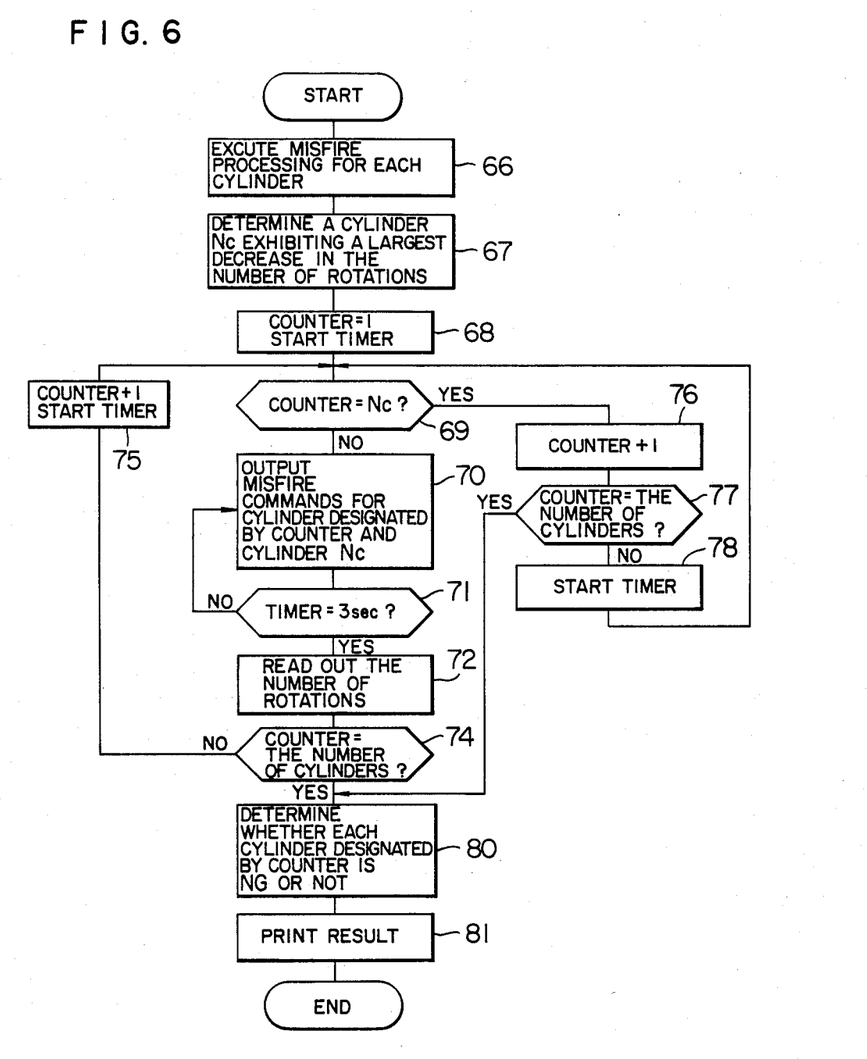
FIG. 6 shows a flow chart for illustrating the operation of another embodiment of the present invention.

This embodiment will now be described by referring to FIG. 6. At a step 66 following the start of program operation, misfire processing for each cylinder is executed and the misfire rotation ratio is calculated for each cylinder in accordance with the same procedures as steps 30 to 54 illustrated in FIG. 3. At a step 67, a cylinder having the largest misfire rotation ratio, i.e., a cylinder exhibiting a largest decrease in the number of rotations is determined, and its identification is stored in a register included in the PIA 22 as a cylinder Nc. At a step 68, a value "1" is set in a counter included in the PIA 22, and it is determined at a step 69 whether the contents of the counter are equal to Nc or not. The counter designates the nunber of a cylinder to be misfired simultaneously with the cylinder Nc. If the answer at the step 69 is "no", the cylinder directed to be misfired by the counter is different from the cylinder Nc. At a step 70, therefore, misfiring command signals respectively for misfiring the cylinder designated by the counter and the cylinder Nc are generated. These cylinders are thus misfired. Details of the step 70 will be described later. Subsequently, it is determined at a step 71 whether the timer has reached 3 seconds or not. If the answer is "no", control is returned to the step 70. If the answer at the step 71 is "yes", the number of rotations of the engine is immediately read out at a step 72, and then it is determined at a step 74 whether the counter has reached the number of cylinders or not. If the answer is "no", the counter is advanced by one step at a step 75 in order to misfire the next cylinder along with the cylinder Nc. At the same time, the timer is started and then control is returned to the step 69. If the answer at the step 69 is "yes", the cylinder designated by the counter is the cylinder Nc. At a step 76, therefore, the counter is further advanced by one step at a step 76. And at a step 77, it is determined whether the contents of the counter are equal to the number of cylinders or not. If the answer is "no", the timer is started at a step 78 and control is returned to the step 69. If the answer at the step 74 or 77 is "yes", it means that measurment of all cylinders has been completed. At a step 80, therefore, it is determined whether or not there is an abnormality for respective cylinders excepting the cylinder Nc. The determination at the step 80 can be conducted in the same way as the steps 54 to 59 illustrated in FIG. 3. The result is printed at a step 81 in the same way as the steps 61 to 64 illustrated in FIG. 3.

Figure 7:
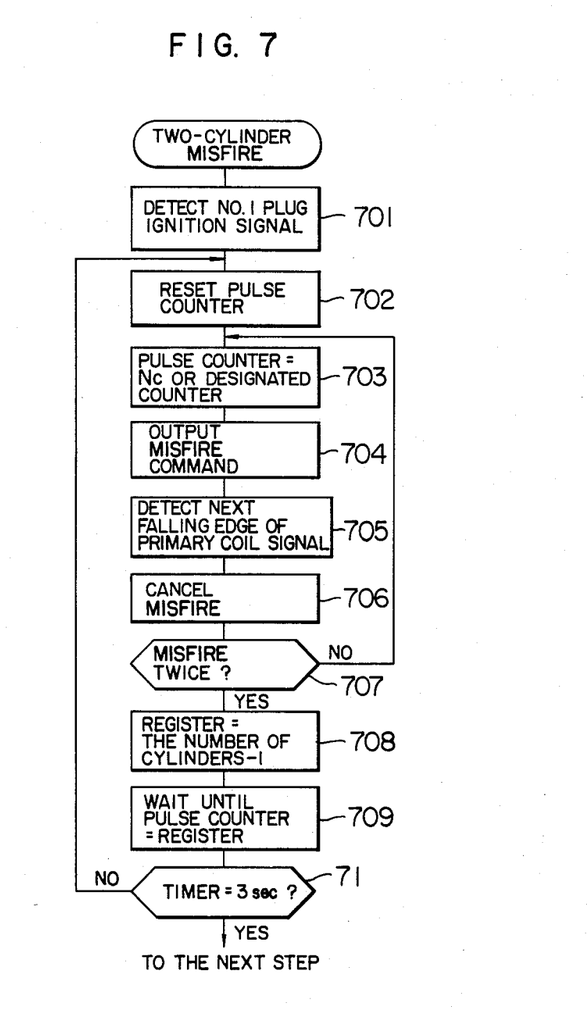
FIG. 7 shows a flow chart which represents steps 70 and 71 of FIG. 6 in detail.

The steps 70 and 71 illustrated in FIG. 6 will now be described in further detail by referring to FIG. 7. If the No. 1 plug ignition signal as illustrated in FIG. 2(D) is detected at a step 701, a pulse counter included in the PIA 22 is reset. The pulse counter counts falling edges of the primary coil signal as illustrated in FIG. 2(B). It is detected at a step 703 that the pulse counter indicates the same value as Nc or the designated counter. And the misfire command signal is outputted at a step 704. At a step 705, the next falling edge of the primary coil signal as illustrated in FIG. 2(B) is detected. And the misfire command is canceled at a step 706. At a step 707, it is determined whether misfire of the cylinder Nc and the cylinder designated by the counter has been completed or not. If the answer is "no", control is returned to the step 703 to execute misfiring of remaining cylinders in the same way as the foregoing description. If the answer at the step 707 is "yes", the number of cylinders less one is stored in the register at a step 708. At a step 709, time is killed until the contents of the pulse counter become coincident with those of the register. If the coincidence is detected at a step 709, it is determined at a step 71 whether the timer has reached 3 seconds or not. If the answer at the step 71 is "no", control is returned to the step 702. In this way, two cylinders are misfired for 3 seconds.

As evident from the foregoing description, the output balance diagnostic apparatus for an internal combustion engine according to the present invention makes it possible to determine whether the mechanical system is working properly by stopping combustion in a particular cylinder without disassembling the engine.

We claim:

1. A cylinder power balance diagnostic apparatus for an internal combustion engine having a plurality of cylinders, comprising:

an ignition device for operating ignitors associated with the cylinders of said internal combustion engine, including an ignition coil having a primary winding;

first means for taking out an ignition signal which is generated in synchronism with a primary signal of said ignition coil primary winding;

generating means for generating a standard pulse on the basis of a firing signal applied from said ignition device to the ignitor associated with a predetermined one of said cylinders;

designating means for designating a cylinder of said internal combustion engine on the basis of an ignition signal from said first means and said standard pulse from said generating means;

misfiring means for selectively connecting a resistor across the ends of said ignition coil primary winding for a predetermined time to cause said cylinder designated by said designating means to misfire;

detecting means for detecting engine speed at least while said designated cylinder is being misfired by said misfiring means;

second means for setting said designating means to designate all cylinders of said internal combustion engine one after another every time the engine speed has been detected by said detecting means; and means for determining whether or not each cylinder is out of order on the basis of the number of engine rotations of the cylinder detected by said detecting means during the time said cylinder is misfiring wherein said second means comprises means for automatically controlling the designating of each cylinder to be misfired on the basis of the number of occurrences of said ignition signal when counted from the occurrence of said standard pulse.

2. A cylinder power balance diagnostic apparatus for an internal combustion engine having a plurality of cylinders, comprising:

an ignition device for operation ignitors associated with the cylinders of said internal combustion engine, including an ingition coil having a primary winding;

first means for taking out an ignition signal which is generated in synchronism with a primary signal of said ignition coil primary winding;

generating means for generating a standard pulse on the basis of a firing signal applied from said ignition device to the ignitor associated with a predetermined one of said cylinders;

designating means for designating a cylinder of said internal combustion engine on the basis of an ignition signal from said first means and said standard pulse from said generating means;

misfiring means for selectively connecting a resistor across the ends of said ignition coil primary winding for a predetermined time to cause said cylinder designated by said designating means to misfire;

detecting means for detecting engine speed at least while said designated cylinder is being misfired by said misfiring means;

second means for setting said designating means to designate all cylinders of said internal combustion engine one after another every time the engine speed has been detected by said detecting means, including period setting means for setting a period during which designation is not supplied by said designating means; and means for determining whether or not each cylinder is out of order on the basis of the number of engine rotations of the cylinder detected by said detecting means during the time said cylinder is misfiring;

wherein said detecting means further comprises third means for detecting the number of rotations of the engine near an end part of said period set by said period setting means; wherein said determining means comprises:

(a) means for calculating the ratio of the number of rotations supplied from said third means to the number of rotations obtained when each cylinder being misfired; and (b) means for determining whether or not each cylinder is out of order according to whether or not the ratio calculated by said calculation means is larger than a predetermined value.

3. A cylinder power balance diagnostic apparatus for an internal combustion engine having a plurality of cylinders according to claim 2, further comprising a device for visually displaying the output of said calculating means.

4. A cylinder power balance diagnostic apparatus for an internal combustion engine having a plurality of cylinders, comprising:

an ignition device for said internal combustion engine, including an igiition coil having a primary circuit;

first means for taking out an ignition signal which is generated in synchronism with a primary signal of said ignition coil primary circuit;

generating means for generating a standard pulse on the basis of a firing signal corresponding to a predetermined standard cylinder;

designating means for designating at least one cylinder of said internal combustion engine on the basis of said ignition signal from said first means and said standard pulse from said generating means, said designating means including one-cylinder designating means for designating one cylinder and two-cylinder designating means for designating two cylinders of said internal combustion engine;

misfiring means for causing at least one cylinder designated by said designating means to misfire for a predetermined time;

detecting means for detecting the engine speed at least while said designated at least one cylinder is being misfired by said misfiring means;

second means for setting said designating means to designate all cylinders of said internal combustion engine one after another every time said engine speed has been detected by said detecting means, said second means including one-cylinder setting means for successively setting said one-cylinder designating means to designate said cylinders one by one and two-cylinder setting means for setting said two cylinder designating means to designate a common cylinder and remaining ones of the cylinders one after another;

common cylinder determining means for selecting a cylinder which exhibits the minimum engine speed of the engine speeds detected by said detecting means during misfiring based on the operation of said one-cylinder setting means, and for designating said selected cylinder as said common cylinder for said two-cylinder setting means; and abnormality determining means for determining whether or not each of said remaining cyliders is out of order on the basis of the engine speeds for said remaining cylinders as detected by said detecting means in response to the operation of said two-cylinder setting means.

* * * * *